(12) United States Patent
Mayyuri et al.

(10) Patent No.: US 12,706,835 B2
(45) Date of Patent: Aug. 11, 2026

(54) SMART LINK AGGREGATION AND/OR SELECTION FOR WEB TRAFFIC

(71) Applicant: QUALCOMM Incorporated, San Diego, CA (US)

(72) Inventors: Vijaya Datta Mayyuri, San Diego, CA (US); An Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 18/656,215

(22) Filed: May 6, 2024

(65) Prior Publication Data

US 2024/0380685 A1 Nov. 14, 2024

Related U.S. Application Data

(60) Provisional application No. 63/501,906, filed on May 12, 2023.

(51) Int. Cl.

| | |
|---|---|
| ***H04L 45/125*** | (2022.01) |
| ***H04L 45/24*** | (2022.01) |
| ***H04L 47/193*** | (2022.01) |
| ***H04L 47/41*** | (2022.01) |

(52) U.S. Cl.

CPC ............ *H04L 45/125* (2013.01); *H04L 45/24* (2013.01); *H04L 47/193* (2013.01); *H04L 47/41* (2013.01)

(58) Field of Classification Search

CPC ..... H04L 45/125; H04L 47/193; H04L 47/41; H04L 45/24

See application file for complete search history.

(56) References Cited

U.S. PATENT DOCUMENTS

| | | | | |
|---|---|---|---|---|
| 6,012,090 | A * | 1/2000 | Chung | H04L 67/1023 709/227 |
| 2016/0099965 | A1* | 4/2016 | Cabrera Escandell | H04L 69/16 726/23 |
| 2019/0068759 | A1* | 2/2019 | Ravi | H04L 45/54 |
| 2022/0078103 | A1* | 3/2022 | Prajapat | H04L 45/3065 |
| 2023/0379398 | A1* | 11/2023 | Su | H04L 69/163 |

FOREIGN PATENT DOCUMENTS

| | | | | |
|---|---|---|---|---|
| EP | 1982434 B1 * | 7/2019 | | H04W 52/367 |
| ES | 2690677 T3 * | 11/2018 | | H04L 45/22 |
| KR | 20180095155 A * | 8/2018 | | H04L 67/02 |
| WO | WO-2018173506 A1 * | 9/2018 | | H04W 88/04 |
| WO | WO-2022132138 A1 * | 6/2022 | | H04N 21/458 |

* cited by examiner

*Primary Examiner* — Kyung H Shin
(74) *Attorney, Agent, or Firm* — Harrity & Harrity, LLP

(57) ABSTRACT

Various aspects generally relate to routing web traffic over multiple internet protocol (IP) interfaces. For example, a user equipment (UE) may receive a request to open, in parallel, multiple transmission control protocol (TCP) socket connections associated with hypertext transfer protocol (HTTP) traffic, distribute the multiple TCP socket connections among multiple available IP interfaces, and route the HTTP traffic associated with the multiple TCP socket connections over the multiple IP interfaces. Additionally, or alternatively, the UE may receive a request to open a user datagram protocol (UDP) socket associated with QUIC traffic, select, from multiple available IP interfaces, a current IP interface that has a best quality of service (QOS) metric, and route the QUIC traffic associated with the UDP socket over the current IP interface. Numerous other aspects are described.

20 Claims, 10 Drawing Sheets

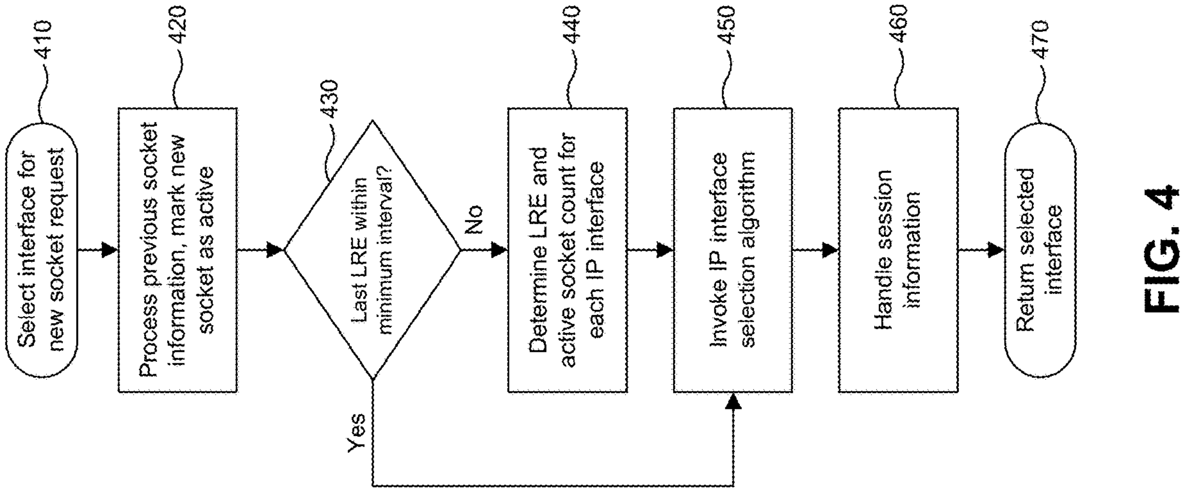
FIG. 4

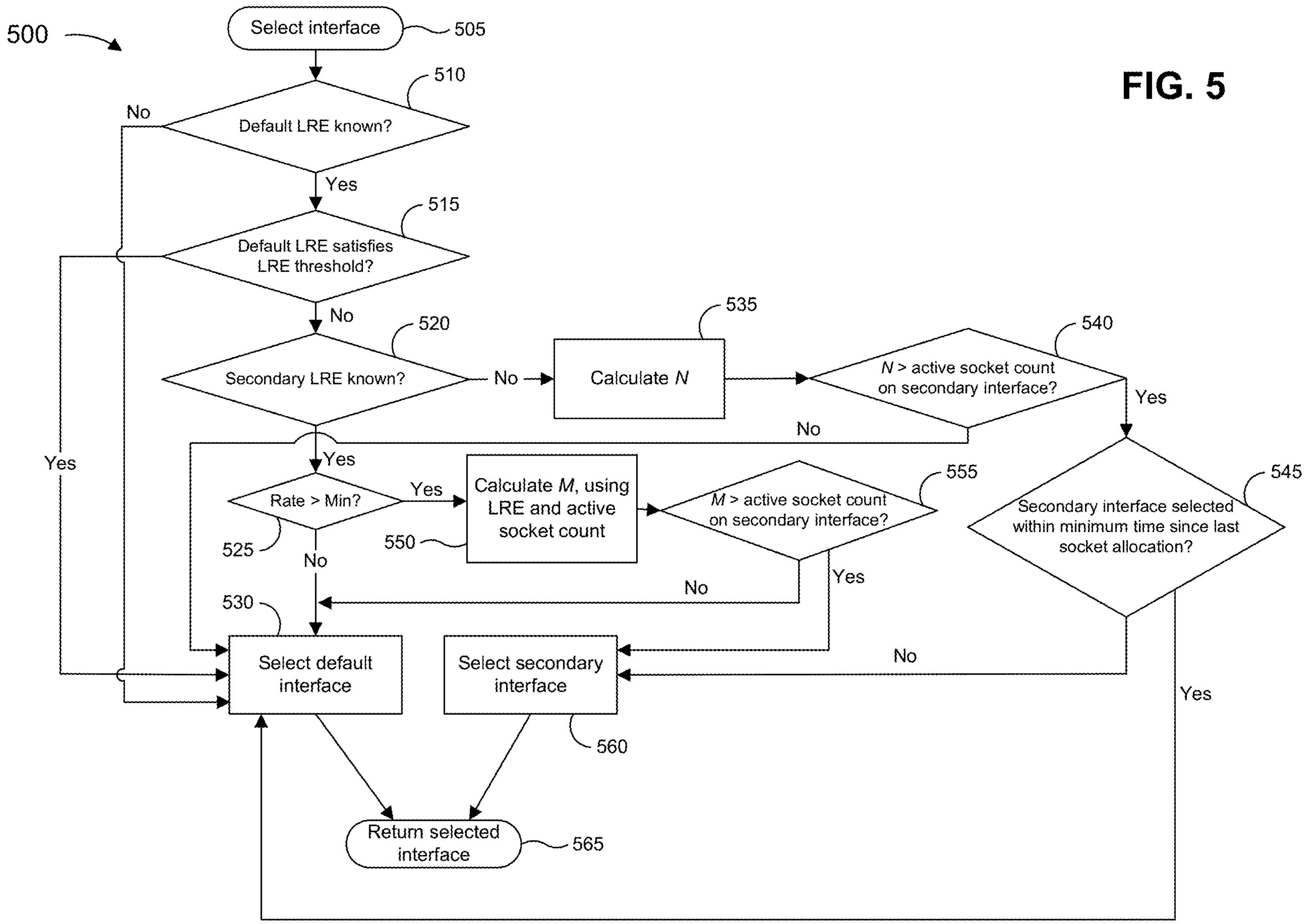
FIG. 5
500
Select interface
505
Default LRE known?
510
Default LRE satisfies LRE threshold?
515
Secondary LRE known?
520
Calculate N
535
N > active socket count on secondary interface?
540
Rate > Min?
525
Calculate M, using LRE and active socket count
550
M > active socket count on secondary interface?
555
Secondary interface selected within minimum time since last socket allocation?
545
Select default interface
530
Select secondary interface
560
Return selected interface
565
Yes
No

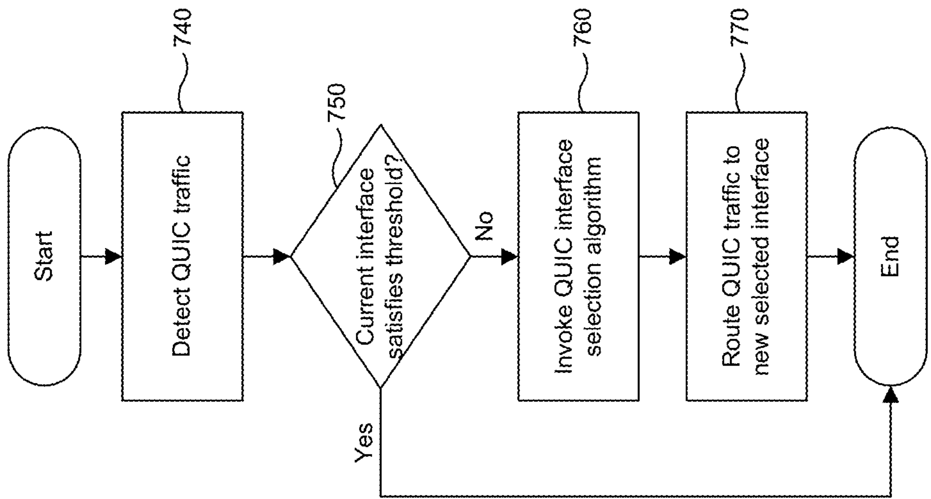
FIG. 7
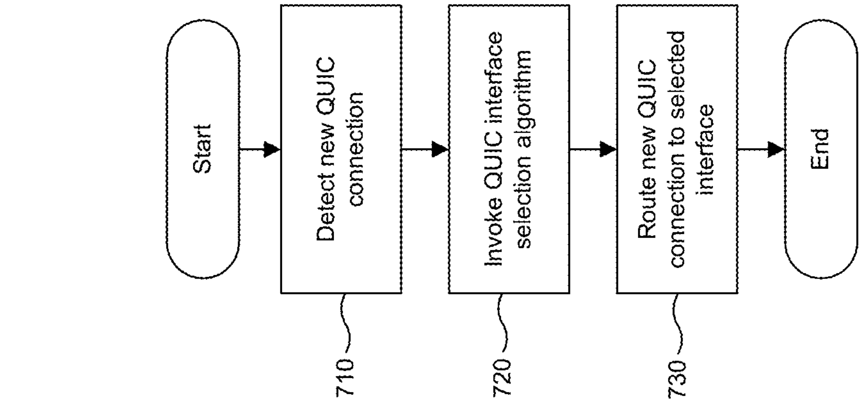

SMART LINK AGGREGATION AND/OR SELECTION FOR WEB TRAFFIC

CROSS-REFERENCE TO RELATED APPLICATION

This patent application claims priority to U.S. Provisional Patent Application No. 63/501,906, filed on May 12, 2023, entitled "SMART LINK AGGREGATION AND/OR SELECTION FOR WEB TRAFFIC," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses associated with smart link aggregation and/or selection for web traffic.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Many user devices have multiple internet protocol (IP) interfaces, such as one or more wireless local area network (WLAN) (or Wi-Fi) interfaces, one or more cellular interfaces, one or more Ethernet interfaces, one or more wireless personal area network (WPAN) (or Bluetooth) interfaces, and/or one or more tethered universal serial bus (USB) interfaces, among other examples. In a typical device, however, a high-level operating system designates one IP interface as a default interface (e.g., often a Wi-Fi interface), which may result in suboptimal performance. For example, the default IP interface may be performing poorly and/or other IP interfaces may be unutilized or underutilized. Accordingly, some aspects described herein relate to techniques to concurrently use multiple IP interfaces to improve performance for web traffic and/or to select an IP interface associated with a best quality of service (QOS) metric to improve performance for web traffic. For example, some aspects described herein relate to smart link aggregation or distribution techniques that can be used to optimally steer hypertext transfer protocol (HTTP) traffic to optimal IP interfaces and a smart link selection technique to assign QUIC traffic to an optimal interface and/or to reassign a QUIC flow to a better IP interface when one is available.

Some aspects described herein relate to a method, performed by a user equipment (UE), for routing HTTP traffic. The method may include receiving a request to open, in parallel, multiple transmission control protocol (TCP) socket connections associated with HTTP traffic. The method may include distributing the multiple TCP socket connections among multiple available IP interfaces, wherein distributing the multiple TCP socket connections includes selecting, from the multiple available IP interfaces, a respective IP interface to associate with each TCP socket connection. The method may include routing the HTTP traffic associated with the multiple TCP socket connections over the multiple IP interfaces.

Some aspects described herein relate to a method, performed by a UE, for routing QUIC traffic. The method may include receiving a request to open a user datagram protocol (UDP) socket associated with QUIC traffic. The method may include selecting, from multiple available IP interfaces, a current IP interface that has a best quality of service (QOS) metric. The method may include routing the QUIC traffic associated with the UDP socket over the current IP interface.

Some aspects described herein relate to a UE for routing HTTP traffic. The UE may include one or more memories and one or more processors coupled to the one or more memories. The one or more processors may be configured to receive a request to open, in parallel, multiple TCP socket connections associated with HTTP traffic. The one or more processors may be configured to distribute the multiple TCP socket connections among multiple available IP interfaces, wherein distributing the multiple TCP socket connections includes selecting, from the multiple available IP interfaces, a respective IP interface to associate with each TCP socket connection. The one or more processors may be configured to route the HTTP traffic associated with the multiple TCP socket connections over the multiple IP interfaces.

Some aspects described herein relate to a UE for routing QUIC traffic. The UE may include one or more memories and one or more processors coupled to the one or more memories. The one or more processors may be configured to receive a request to open a UDP socket associated with QUIC traffic. The one or more processors may be configured to select, from multiple available IP interfaces, a current IP interface that has a best QoS metric. The one or more processors may be configured to route the QUIC traffic associated with the UDP socket over the current IP interface.

Some aspects described herein relate to a non-transitory computer-readable medium that stores a set of instructions for routing HTTP traffic by a UE. The set of instructions, when executed by one or more processors of the UE, may cause the UE to receive a request to open, in parallel, multiple TCP socket connections associated with HTTP traffic. The set of instructions, when executed by one or more processors of the UE, may cause the UE to distribute the multiple TCP socket connections among multiple available IP interfaces, wherein distributing the multiple TCP socket connections includes selecting, from the multiple available IP interfaces, a respective IP interface to associate with each TCP socket connection. The set of instructions, when executed by one or more processors of the UE, may cause the UE to route the HTTP traffic associated with the multiple TCP socket connections over the multiple IP interfaces.

Some aspects described herein relate to a non-transitory computer-readable medium that stores a set of instructions for routing QUIC traffic by a UE. The set of instructions, when executed by one or more processors of the UE, may cause the UE to receive a request to open a UDP socket associated with QUIC traffic. The set of instructions, when executed by one or more processors of the UE, may cause the UE to select, from multiple available IP interfaces, a current IP interface that has a best QoS metric. The set of instructions, when executed by one or more processors of the UE, may cause the UE to route the QUIC traffic associated with the UDP socket over the current IP interface.

Some aspects described herein relate to an apparatus for routing HTTP traffic. The apparatus may include means for receiving a request to open, in parallel, multiple TCP socket connections associated with HTTP traffic. The apparatus may include means for distributing the multiple TCP socket connections among multiple available IP interfaces, wherein distributing the multiple TCP socket connections includes selecting, from the multiple available IP interfaces, a respective IP interface to associate with each TCP socket connection. The apparatus may include means for routing the HTTP traffic associated with the multiple TCP socket connections over the multiple IP interfaces.

Some aspects described herein relate to an apparatus for routing QUIC traffic. The apparatus may include means for receiving a request to open a UDP socket associated with QUIC traffic. The apparatus may include means for selecting, from multiple available IP interfaces, a current IP interface that has a best QoS metric. The apparatus may include means for routing the QUIC traffic associated with the UDP socket over the current IP interface.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3-5 are diagrams illustrating examples associated with routing hypertext transfer protocol (HTTP) traffic, in accordance with the present disclosure.

FIGS. 7-8 are diagrams illustrating example processess associated with routing QUIC traffic, in accordance with the present disclosure.

DETAILED DESCRIPTION

Figure 1:
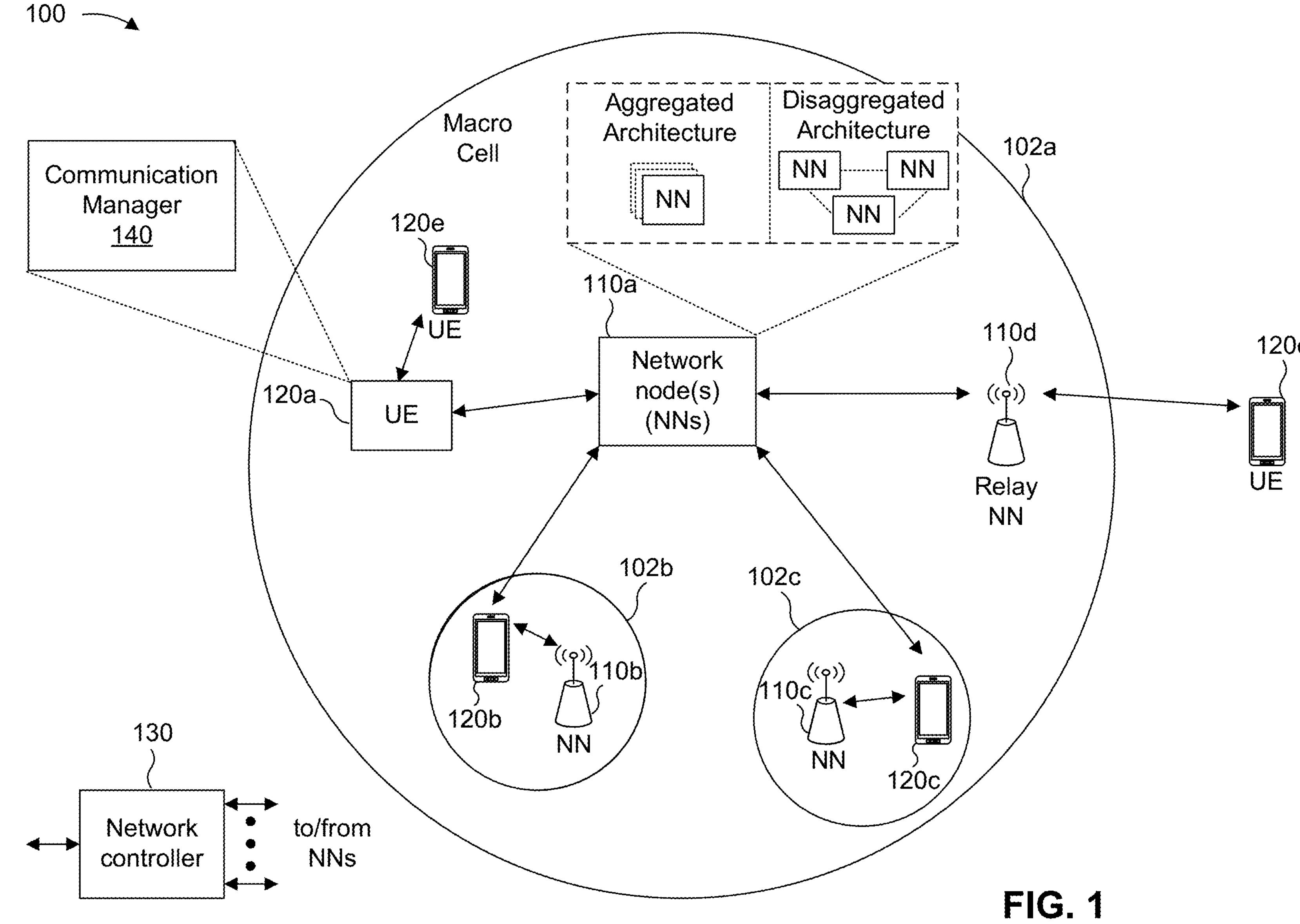
FIG. 1 is a diagram illustrating an example of a wireless network, in accordance with the present disclosure.

Many user devices have multiple internet protocol (IP) interfaces, such as one or more wireless local area network (WLAN) (or Wi-Fi) interfaces, one or more cellular interfaces, one or more Ethernet interfaces, one or more wireless personal area network (WPAN) (or Bluetooth) interfaces, and/or one or more tethered universal serial bus (USB) interfaces, among other examples. In a typical device, however, a high-level operating system designates one IP interface as a default interface (e.g., often a Wi-Fi interface), which may result in suboptimal performance. For example, the default IP interface may be performing poorly and/or other IP interfaces may be unutilized or underutilized. Accordingly, some aspects described herein relate to techniques to concurrently use multiple IP interfaces to improve performance for web traffic and/or to select an IP interface associated with a best quality of service (QOS) metric to improve performance for web traffic. For example, some aspects described herein relate to smart link aggregation or distribution techniques that can be used to optimally steer hypertext transfer protocol (HTTP) traffic to optimal IP interfaces and a smart link selection technique to assign QUIC traffic to an optimal interface and/or to reassign a QUIC flow to a better IP interface when one is available.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHz). It should be understood that although a portion of FR1 is greater than 6 GHZ, FRI is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FRI, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a request to open, in parallel, multiple transmission control protocol (TCP) socket connections associated with HTTP traffic; distribute the multiple TCP socket connections among multiple available IP interfaces, wherein distributing the multiple TCP socket connections includes selecting, from the multiple available IP interfaces, a respective IP interface to associate with each TCP socket connection; and route the HTTP traffic associated with the multiple TCP socket connections over the multiple IP interfaces. Additionally, or alternatively, the communication manager 140 may receive a request to open a user datagram protocol (UDP) socket associated with QUIC traffic; select, from multiple available IP interfaces, a current IP interface that has a best QoS metric; and route the QUIC traffic associated with the UDP socket over the current IP interface. Additionally, or alternatively, the communication manager 140 may perform one or more other operations described herein.

As indicated above, FIG. 1 is provided as an example. Other examples may differ from what is described with regard to FIG. 1.

Figure 2:
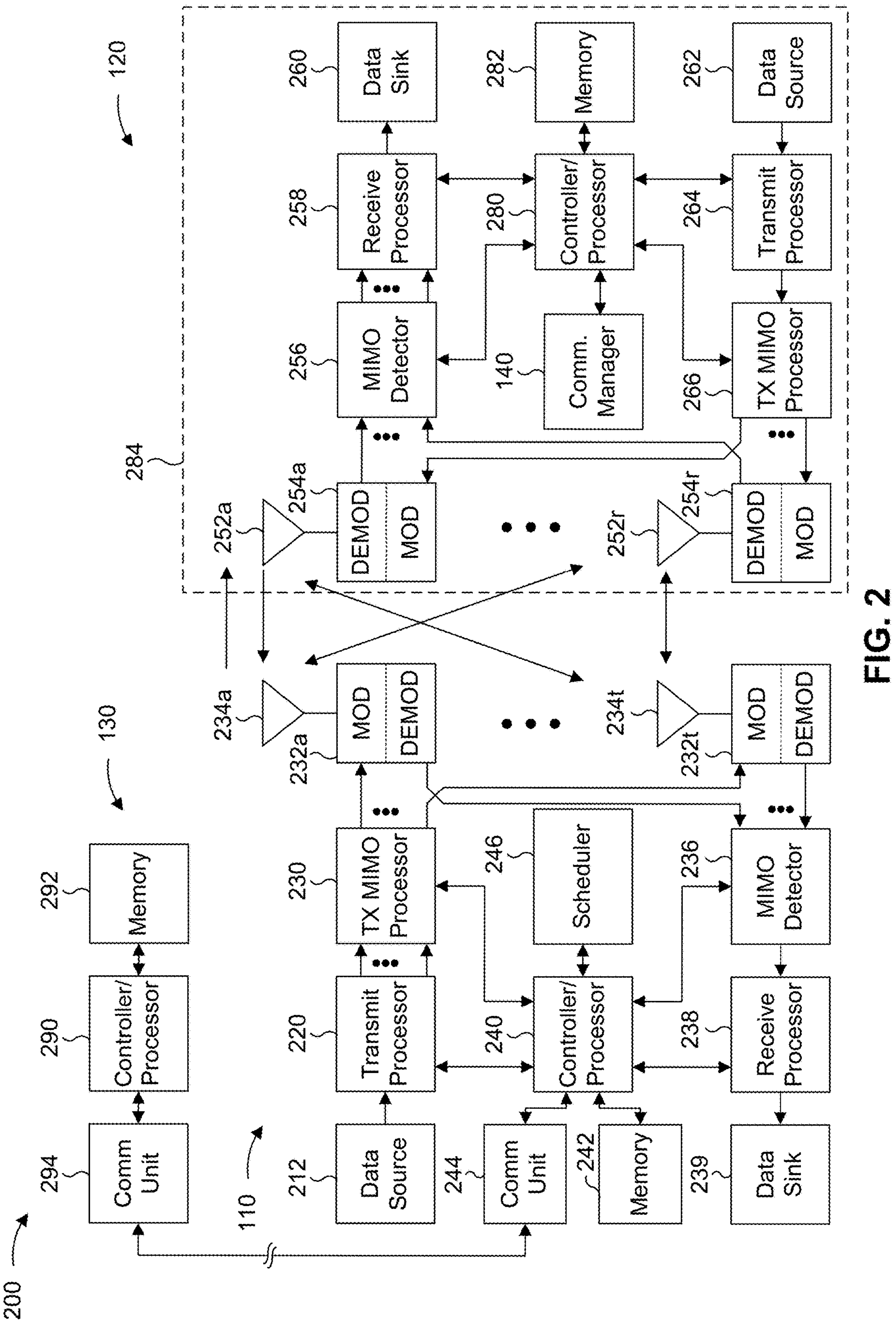
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-10).

The controller/processor 240 of the network node 110, the controller/processor 280 of the UE 120, and/or any other component(s) of FIG. 2 may perform one or more techniques associated with smart link aggregation and/or selection for web traffic, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for receiving a request to open, in parallel, multiple TCP socket connections associated with HTTP traffic; means for distributing the multiple TCP socket connections among multiple available IP interfaces, wherein distributing the multiple TCP socket connections includes selecting, from the multiple available IP interfaces, a respective IP interface to associate with each TCP socket connection; and/or means for routing the HTTP traffic associated with the multiple TCP socket connections over the multiple IP interfaces.

Additionally, or alternatively, the UE 120 includes means for receiving a request to open a UDP socket associated with QUIC traffic; means for selecting, from multiple available IP interfaces, a current IP interface that has a best QoS metric;

and/or means for routing the QUIC traffic associated with the UDP socket over the current IP interface. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
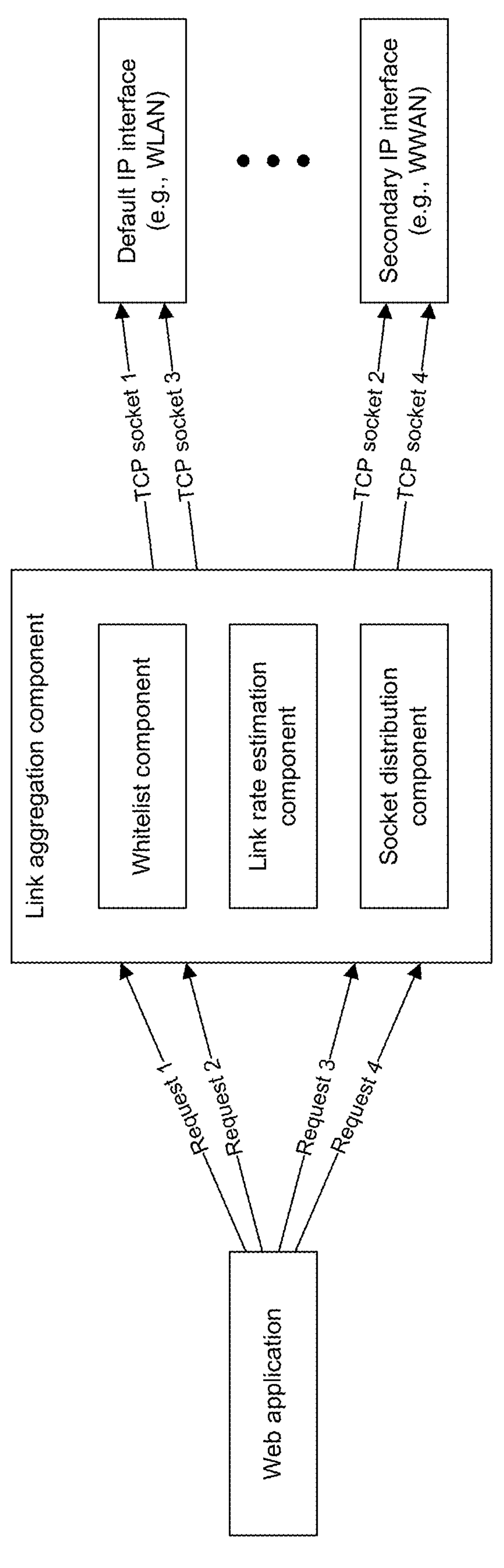

FIG. 3 is a diagram illustrating an example 300 associated with routing HTTP traffic, in accordance with the present disclosure. As described herein, a UE may include multiple IP interfaces that are concurrently available, such as one or more WLAN (e.g., Wi-Fi) interfaces, one or more cellular (e.g., 4G, 5G, 6G, or the like) interfaces, one or more dual cellular (DSDA) interfaces, one or more dual WLAN (e.g., dual WLAN) interfaces, one or more WPAN (e.g., Bluetooth) interfaces, and/or one or more tethered USB interfaces, among other examples. However, one challenge that often arises is that a high-level operating system (HLOS) typically configures one interface to be a default interface for all web traffic associated with the device.

Accordingly, some aspects described herein relate to techniques to concurrently use multiple IP interfaces to improve performance for web traffic and/or to select an IP interface associated with a best QoS metric to improve performance for web traffic. For example, some aspects described herein relate to smart link aggregation or distribution techniques that can be used to optimally steer HTTP traffic to optimal IP interfaces. For example, as shown in FIG. 3, a UE may include a link aggregation component that may receive, from a web application (e.g., a web browser), a request to open one or more TCP socket connections (e.g., in a RESTful manner) in parallel to download multiple objects (e.g., text objects, image objects, and/or video objects, among other examples) from a web page. For example, the link aggregation component may perform TCP socket aggregation at a TCP connection-level, where TCP socket connections may be distributed over all available IP links in a distributed manner and/or according to other suitable techniques. For example, in some aspects, the number of available IP connections may depend or may be otherwise adjusted based on network conditions (e.g., allowing an IP interface to be associated with a better QoS metric when the estimated link rate associated with the IP interface is relatively high, or allowing an IP interface to be associated with a low QoS metric when the estimated link rate associated with the IP interface is relatively low). In this way, the smart link aggregation techniques shown in FIG. 3 may be used in various scenarios, including unsecured HTTP or secured HTTP, without requiring inspection of an HTTP header.

As shown in FIG. 3, a smart link aggregation (SLA) component may include a whitelist component, a link rate estimation component, and a socket distribution component. For example, in some aspects, the whitelist component may include a list of one or more applications that controls one or more applications or application traffic that is allowed to leverage a smart link aggregation technique described herein. Additionally, or alternatively, the link rate estimation component may measure a current bandwidth for each available IP interface associated with the UE, and the socket distribution algorithm may be invoked to run each time that a new connection/socket is created by an SLA whitelisted application and/or an outbound IP interface for the connection/socket matches a whitelisted SLA application.

As indicated above, FIG. 3 is provided as an example. Other examples may differ from what is described with regard to FIG. 3.

FIG. 4 is a diagram illustrating an example 400 associated with routing HTTP traffic, in accordance with the present disclosure. As shown in FIG. 4, example 400 includes communication between a network node (e.g., network node 110) and a UE (e.g., UE 120). In some aspects, the network node and the UE may be included in a wireless network, such as wireless network 100. The network node and the UE may communicate via a wireless access link, which may include an uplink and a downlink.

As shown in FIG. 4, and by reference number 410, the UE may be configured to perform an interface selection technique to select an appropriate IP interface for a new TCP socket request. In some aspects, as shown by reference number 420, the UE may process previous socket information (e.g., related to TCP socket connections for TCP sockets that were previously created) and/or may mark a new TCP socket as inactive. In some aspects, as shown by decisional block 430, the UE may determine whether a last rate estimate for the current IP interface is within a minimum time interval for rate estimation. In some aspects, if the UE determines that the last rate estimate for the current IP interface is within the minimum time interval for rate estimation, the UE may select a current IP interface (e.g., based on a current rate estimate and/or an active rate count), as shown by reference number 450. Otherwise, if the UE determines at block 430 that the last rate estimate for the current IP interface is not within the minimum time interval for rate estimation, at block 440, the UE may select a current IP interface, as shown by reference number 450. Accordingly, in some aspects, the SLA component may determine which interface to use during socket connect request processing based on rate estimates and active socket count of the interfaces. In some aspects, as shown by block 460, the UE may return session information for handling the current request, which may include a current rate estimate per IP interface, an active socket count per IP interface, or the like. As further shown in FIG. 4, and by reference number 470, the UE may handle information associated with the current session, which may include routing HTTP traffic over one or more selected IP interfaces (e.g., based on link rate estimates or active socket counts associated with each IP interface), among other examples.

As indicated above, FIG. 4 is provided as an example. Other examples may differ from what is described with regard to FIG. 4.

FIG. 5 is a diagram illustrating an example 500 associated with routing HTTP traffic, in accordance with the present disclosure. As shown in FIG. 5, example 500 includes communication between a network node (e.g., network node 110) and a UE (e.g., UE 120). In some aspects, the network node and the UE may be included in a wireless network, such as wireless network 100. The network node and the UE may communicate via a wireless access link, which may include an uplink and a downlink.

As shown in FIG. 5, and by reference number 505, a UE may receive a request to select an IP interface for a particular IP request. In some aspects, as shown by block 510, the UE may determine whether a link rate estimate is known for the default interface. In cases where the link rate estimate is unknown for the default IP interface, the UE may select the default IP interface (e.g., the WLAN interface), as shown by block 530. Otherwise, if the link reference estimate for the current IP interface is known, the UE may determine whether the link rate estimate for the default IP interface satisfies a threshold, as shown by block 515. If the link rate estimate for the default IP interface satisfies the threshold at block 515, the UE may select the default IP interface (e.g., the WLAN interface), as shown by block 530. Alternatively, if the link rate estimate for the default IP interface fails to satisfy the threshold at block 515, the UE may determine whether the link rate estimate for the secondary IP interface is known, as shown by block 520. If the link rate estimate for the secondary IP interface is known at block 520, the UE may then determine whether the link rate estimate for the secondary IP interface exceeds a minimum rate for the secondary IP interface, as shown by block 525. If the link rate estimate for the secondary IP interface does not exceed the minimum rate for the secondary IP interface at block 525, the UE may select a default IP interface at block 530. Otherwise, if the UE determines, at block 520, that the secondary link rate estimate is unknown, the UE may determine N at block 535, where N represents a number of connections to be scheduled on the secondary IP interface. In some aspects, as shown by block 540, if N exceeds the active socket count on the secondary IP interface, the UE may determine, at block 545, whether the secondary IP interface was selected within a minimum time between a socket allocation since a last socket allocation on the secondary IP interface when the rate estimate was unknown for the secondary IP interface. In some aspects, if the link rate estimate for the secondary IP interface exceeds the minimum rate for the secondary IP interface at block 525, the UE may calculate a number of connections, M, to be scheduled on the secondary IP interface and/or using the link rate estimate and active socket count for the secondary IP interface, as shown by block 550.

In some aspects, as shown by block 555, in cases where the number of connections, M, to be scheduled on the secondary IP interface and/or using the link rate estimate and active socket count for the secondary IP interface, exceeds the active socket count on the secondary IP interface, the UE may select the default IP interface at block 530. Additionally, or alternatively, in cases where the number of connections, M, to be scheduled on the secondary IP interface and/or using the link rate estimate and active socket count for the secondary IP interface, is less than or equal to the active socket count on the secondary IP interface at block 555, the UE may select the secondary IP interface at block 560. In some aspects, as shown by block 565, the interface selection algorithm may return the selected IP interface (e.g., the primary or default IP interface or secondary IP interface).

As indicated above, FIG. 5 is provided as an example. Other examples may differ from what is described with regard to FIG. 5.

Figure 6:
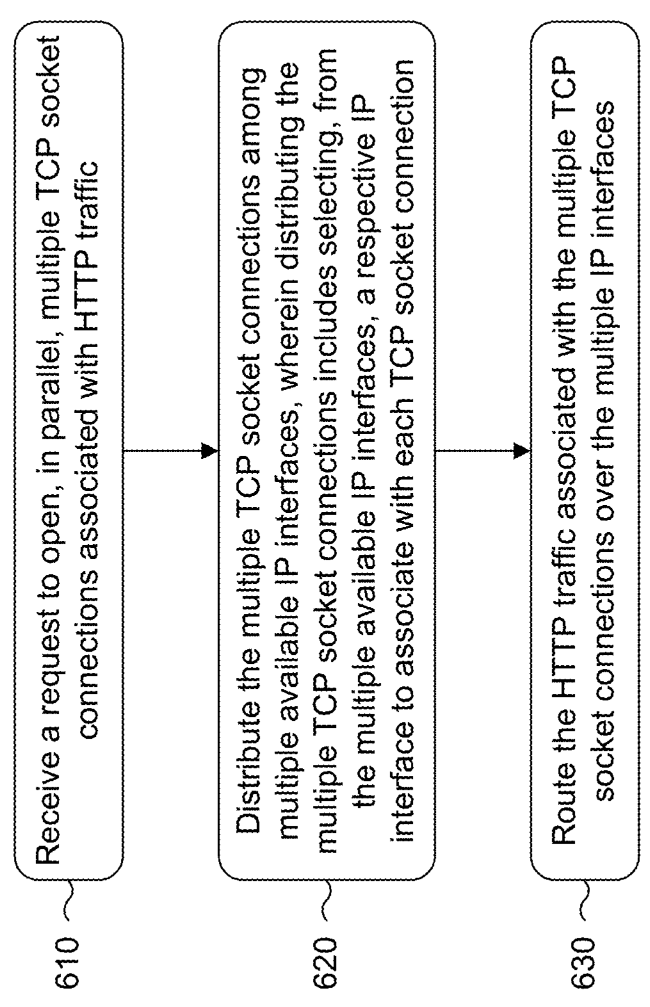
FIG. 6 is a diagram illustrating an example process associated with routing HTTP traffic, in accordance with the present disclosure.

FIG. 6 is a diagram illustrating an example process 600 performed, for example, by a UE, in accordance with the present disclosure. Example process 600 is an example where the UE (e.g., UE 120) performs operations associated with smart link aggregation and/or selection for web traffic.

As shown in FIG. 6, in some aspects, process 600 may include receiving a request to open, in parallel, multiple TCP socket connections associated with HTTP traffic (block 610). For example, the UE (e.g., using reception component 1002 and/or communication manager 1006, depicted in FIG. 10) may receive a request to open, in parallel, multiple TCP socket connections associated with HTTP traffic, as described above.

As further shown in FIG. 6, in some aspects, process 600 may include distributing the multiple TCP socket connections among multiple available IP interfaces, wherein distributing the multiple TCP socket connections includes selecting, from the multiple available IP interfaces, a respective IP interface to associate with each TCP socket connection (block 620). For example, the UE (e.g., using communication manager 1006, depicted in FIG. 10) may distribute the multiple TCP socket connections among multiple available IP interfaces, wherein distributing the multiple TCP socket connections includes selecting, from the multiple available IP interfaces, a respective IP interface to associate with each TCP socket connection, as described above.

As further shown in FIG. 6, in some aspects, process 600 may include routing the HTTP traffic associated with the multiple TCP socket connections over the multiple IP interfaces (block 630). For example, the UE (e.g., using communication manager 1006, depicted in FIG. 10) may route the HTTP traffic associated with the multiple TCP socket connections over the multiple IP interfaces, as described above.

Process 600 may include additional aspects, such as any single aspect or any combination of aspects described below and/or in connection with one or more other processes described elsewhere herein.

In a first aspect, the respective IP interface to associate with each TCP socket connection is selected according to a link rate estimate or a number of active connections associated with each of the multiple available IP interfaces.

In a second aspect, alone or in combination with the first aspect, process 600 includes determining one or more of a link rate estimate or a number of active connections associated with each of the multiple available IP interfaces based on a time interval since a most recent update that satisfied a threshold.

In a third aspect, alone or in combination with one or more of the first and second aspects, the respective IP interface to associate with each TCP socket connection is selected according to a round robin scheduling algorithm.

In a fourth aspect, alone or in combination with one or more of the first through third aspects, the respective IP interface to associate with each TCP socket connection is selected from the multiple available IP interfaces based on the request originating from an application that is included in a whitelist.

In a fifth aspect, alone or in combination with one or more of the first through fourth aspects, selecting the IP interface to associate with a TCP socket connection, included among the multiple TCP socket connections, includes selecting a default IP interface based on the default IP interface not having a current rate estimate.

In a sixth aspect, alone or in combination with one or more of the first through fifth aspects, selecting the IP interface to associate with a TCP socket connection, included among the multiple TCP socket connections, includes selecting a default IP interface based on the default IP interface having a current rate estimate that satisfies a threshold.

In a seventh aspect, alone or in combination with one or more of the first through sixth aspects, selecting the IP interface to associate with a TCP socket connection, included among the multiple TCP socket connections, includes selecting a default IP interface based on a secondary IP interface having a current rate estimate that fails to satisfy a threshold.

In an eighth aspect, alone or in combination with one or more of the first through seventh aspects, selecting the IP interface to associate with a TCP socket connection, included among the multiple TCP socket connections, includes calculating, based on a secondary IP interface having a current rate estimate that satisfies a threshold, a number of TCP socket connections to be scheduled on the secondary IP interface using the current rate estimate, and selecting a default IP interface based on the number of TCP socket connections to be scheduled on the secondary IP interface not exceeding an active socket count associated with the secondary IP interface.

In a ninth aspect, alone or in combination with one or more of the first through eighth aspects, selecting the IP interface to associate with a TCP socket connection, included among the multiple TCP socket connections, includes calculating, based on a secondary IP interface having a current rate estimate that satisfies a threshold, a number of TCP socket connections to be scheduled on the secondary IP interface using the current rate estimate, and selecting the secondary IP interface based on the number of TCP socket connections to be scheduled on the secondary IP interface exceeding an active socket count associated with the secondary IP interface.

In a tenth aspect, alone or in combination with one or more of the first through ninth aspects, selecting the IP interface to associate with a TCP socket connection, included among the multiple TCP socket connections, includes calculating a number of TCP socket connections to be scheduled on a secondary IP interface based on the secondary IP interface lacking a current rate estimate, and selecting a default IP interface based on the number of TCP socket connections to be scheduled on the secondary IP interface not exceeding an active socket count associated with the secondary IP interface.

In an eleventh aspect, alone or in combination with one or more of the first through tenth aspects, selecting the IP interface to associate with a TCP socket connection, included among the multiple TCP socket connections, includes calculating a number of TCP socket connections to be scheduled on a secondary IP interface based on the secondary IP interface lacking a current rate estimate, determining that the number of TCP socket connections to be scheduled on the secondary IP interface exceeds an active socket count associated with the secondary IP interface, and selecting a default IP interface based on a time period, since a last selection of the secondary IP interface when the current rate estimate is unknown for the secondary IP interface, failing to satisfy a threshold.

In a twelfth aspect, alone or in combination with one or more of the first through eleventh aspects, selecting the IP interface to associate with a TCP socket connection, included among the multiple TCP socket connections, includes calculating a number of TCP socket connections to be scheduled on a secondary IP interface based on a secondary IP interface lacking a current rate estimate, determining that the number of TCP socket connections to be scheduled on the secondary IP interface exceeds an active socket count associated with the secondary IP interface, and selecting the secondary IP interface based on a time period, since a last selection of the secondary IP interface when the current rate estimate is unknown for the secondary IP interface, satisfying a threshold.

In a thirteenth aspect, alone or in combination with one or more of the first through twelfth aspects, the multiple available IP interfaces include one or more of a WLAN interface, a cellular interface, an Ethernet interface, a WPAN interface, or a tethered USB interface.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 associated with routing QUIC traffic, in accordance with the present disclosure. As shown in FIG. 7, example process 700 includes communication between a network node (e.g., network node 110) and a UE (e.g., UE 120). In some aspects, the network node and the UE may be included in a wireless network, such as wireless network 100. The network node and the UE may communicate via a wireless access link, which may include an uplink and a downlink.

In some aspects, as described herein, QUIC is a UDP based protocol that is being used by services such as YouTube, Gmail, and/or Facebook, among other examples. Unlike standard HTTP and/or HTTPs based web pages that often contain many resources that can be fetched in parallel, QUIC tends to use a single UDP socket to maintain the session and exchange content between the client and the server. Accordingly, some aspects described herein may relate to a QUIC mode detector that can monitor network traffic for QUIC connections and enable smart link QUIC functionality. Additionally, or alternatively, a QUIC socket assignment function may be invoked when a new QUIC connection is established and may be used to route a connection to an interface selected by a QUIC interface selection algorithm. Furthermore, a QUIC interface selection algorithm may run periodically and may be configured to determine a best interface to handle QUIC traffic.

In some aspects, as shown by reference number 710, the UE may detect a new QUIC connection. In such cases, as shown by reference number 720, the UE may invoke a QUIC interface selection algorithm to determine the IP interface to associate with the new QUIC connection. In such cases, as shown by reference number 730, the UE may then route QUIC traffic associated with the new QUIC connection over the selected IP interface. Otherwise, as shown by reference number 740, the UE may periodically detect QUIC traffic and may determine, at block 750, whether the current IP interface satisfies a threshold, such as a bandwidth requirement for the QUIC traffic. In some aspects, in cases where the current IP interface satisfies the threshold, the process may end at block 750. Otherwise, in cases where the current IP interface does not satisfy the threshold, at block 760, the UE may invoke an algorithm to determine a QUIC interface to associate with the QUIC traffic. In some aspects, at block 770, the UE may then route the QUIC traffic over the newly selected QUIC interface.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
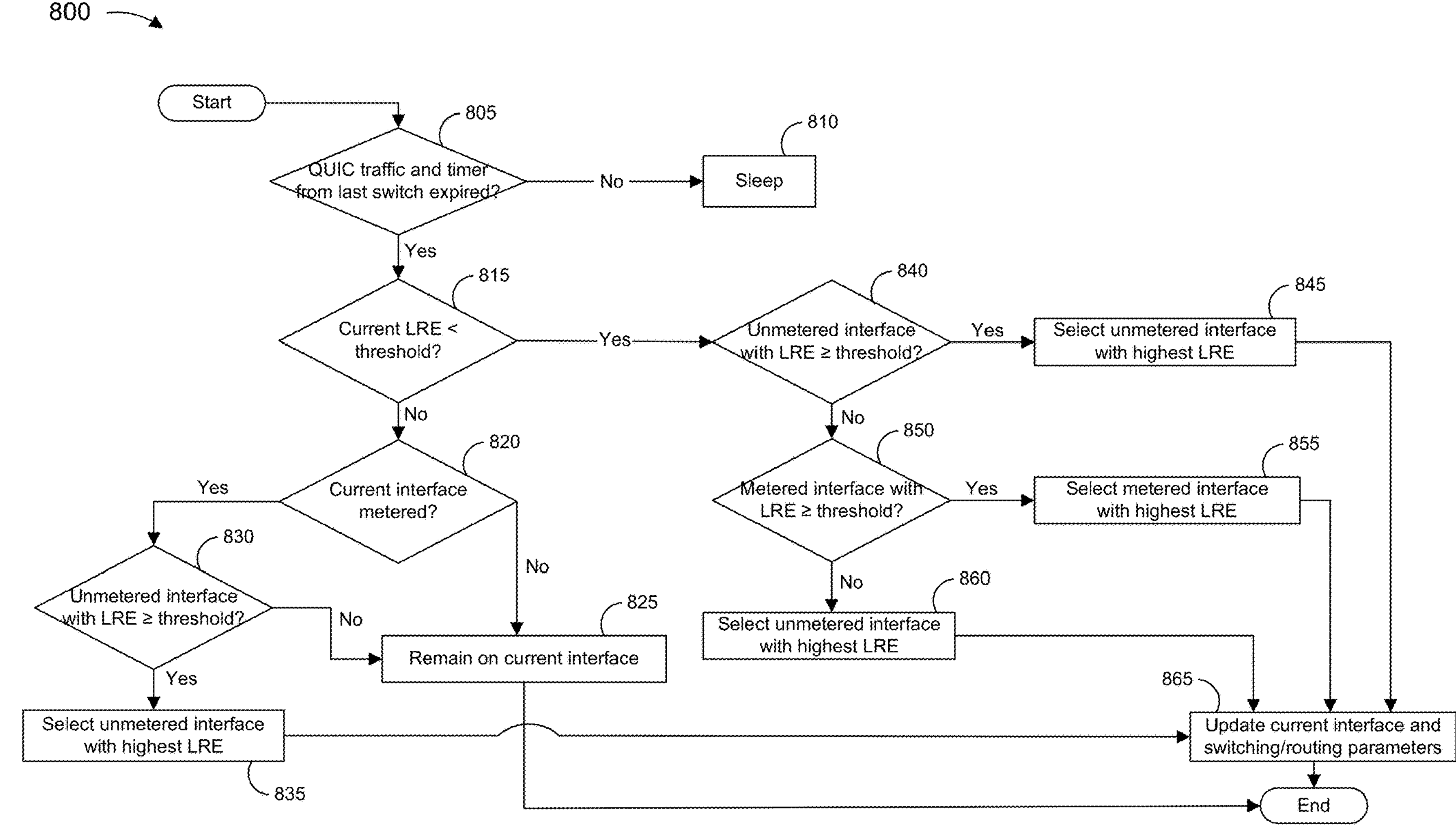

FIG. 8 is a diagram illustrating an example process 800 associated with routing QUIC traffic, in accordance with the present disclosure. As shown in FIG. 8, example process 800 includes communication between a network node (e.g., network node 110) and a UE (e.g., UE 120). In some aspects, the network node and the UE may be included in a wireless network, such as wireless network 100. The network node and the UE may communicate via a wireless access link, which may include an uplink and a downlink.

In some aspects, as shown by reference number 805, the UE may determine whether QUIC traffic is detected and/or whether a timer from a last switch of the IP interface associated with an IP flow has expired. In some aspects, if the QUIC traffic is not detected and/or the timer from the last switch of the IP interface associated with an IP flow has not expired, the UE may enter a sleep state at block 810. Otherwise, if the QUIC traffic is detected and the timer from the last switch of the IP interface associated with an IP flow has expired, the UE may determine whether the current interface link rate estimate satisfies (e.g., is less than) a link rate estimate threshold at block 815. If the current interface link rate estimate does not satisfy (e.g., is greater than or equal to) the link rate estimate threshold at block 815, the UE may determine, at block 820, whether the current IP interface is metered. In some aspects, if the current IP interface is unmetered, the UE may remain on the current IP interface, as shown by block 825. Alternatively, if the current IP interface is metered, the UE may determine whether there is an unmetered IP interface with a link rate estimate that satisfies a threshold at block 830. If there is no unmetered IP interface with a link rate estimate that satisfies the threshold at block 830, the UE may remain on the current IP interface, as shown by block 825. Alternatively, if there is an unmetered IP interface with a link rate estimate that satisfies the threshold at block 830, the UE may select the unmetered interface with the highest link rate estimate, as shown by block 835. Alternatively, if the link rate estimate for the current IP interface satisfies (e.g., does not equal or exceed) the link rate estimate threshold at block 815, the UE may determine whether there is an unmetered interface with a link rate estimate that satisfies the applicable threshold at block 840.

In some aspects, if there is an unmetered interface with a link rate estimate that satisfies the applicable threshold at block 840, the UE may select an unmetered IP interface with a highest link rate estimate at block 845. Additionally, or alternatively, if the link rate estimate for the current IP interface does not equal or exceed the link rate estimate threshold, the UE may determine whether there is a metered interface with a link rate estimate that satisfies the applicable threshold at block 850. In some aspects, if there is a metered interface with a link rate estimate that satisfies the applicable threshold at block 850, the UE may select a metered IP interface with a highest link rate estimate at block 855. Otherwise, if there is no metered or unmetered interface with a link rate estimate that satisfies the applicable threshold, the UE may select an unmetered IP interface with a highest link rate estimate at block 860. In some aspects, as shown by block 865, the UE may then update one or more parameters, such as a current IP interface used to route HTTP and/or QUIC traffic and/or one or more parameters related to routing the HTTP and/or QUIC traffic, such as a current switch time and/or an IP route change time.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
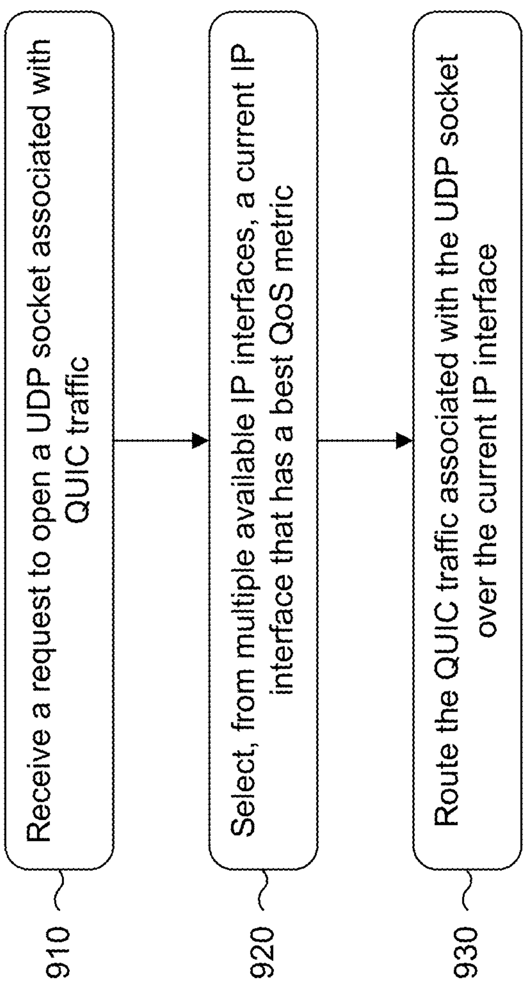
FIG. 9 is a diagram illustrating an example process associated with routing QUIC traffic, in accordance with the present disclosure.

FIG. 9 is a diagram illustrating an example process 900 performed, for example, by a UE, in accordance with the present disclosure. Example process 900 is an example where the UE (e.g., UE 120) performs operations associated with smart link aggregation and/or selection for web traffic.

As shown in FIG. 9, in some aspects, process 900 may include receiving a request to open a UDP socket associated with QUIC traffic (block 910). For example, the UE (e.g., using reception component 1002 and/or communication manager 1006, depicted in FIG. 10) may receive a request to open a UDP socket associated with QUIC traffic, as described above.

As further shown in FIG. 9, in some aspects, process 900 may include selecting, from multiple available IP interfaces, a current IP interface that has a best QoS metric (block 920). For example, the UE (e.g., using communication manager 1006, depicted in FIG. 10) may select, from multiple available IP interfaces, a current IP interface that has a best QoS metric, as described above.

As further shown in FIG. 9, in some aspects, process 900 may include routing the QUIC traffic associated with the UDP socket over the current IP interface (block 930). For example, the UE (e.g., using communication manager 1006, depicted in FIG. 10) may route the QUIC traffic associated with the UDP socket over the current IP interface, as described above.

Process 900 may include additional aspects, such as any single aspect or any combination of aspects described below and/or in connection with one or more other processes described elsewhere herein.

In a first aspect, process 900 includes selecting, from the multiple available IP interfaces, a new IP interface to associate with the UDP socket based on the QoS metric associated with the current IP interface failing to satisfy a bandwidth requirement associated with the QUIC traffic, and routing the QUIC traffic associated with the UDP socket over the new IP interface.

In a second aspect, alone or in combination with the first aspect, the new IP interface is selected based on expiration of a timer since a most recent switch of the IP interface associated with the UDP socket.

In a third aspect, alone or in combination with one or more of the first and second aspects, selecting the new IP interface to associate with the UDP socket includes remaining on the current IP interface, such that the new IP interface is the current IP interface, based on the current IP interface being unmetered and having a link rate estimate that satisfies a threshold.

In a fourth aspect, alone or in combination with one or more of the first through third aspects, selecting the new IP interface to associate with the UDP socket includes remaining on the current IP interface, such that the new IP interface is the current IP interface, based on the current IP interface being metered and having a link rate estimate that satisfies a threshold, and further based on the multiple available IP interfaces not including an unmetered IP interface with a link rate estimate that satisfies the threshold.

In a fifth aspect, alone or in combination with one or more of the first through fourth aspects, selecting the new IP interface to associate with the UDP socket includes selecting, as the new IP interface, an unmetered IP interface included among the multiple available IP interfaces with a link rate estimate that satisfies a threshold, based on the current IP interface being metered and having a link rate estimate that satisfies the threshold.

In a sixth aspect, alone or in combination with one or more of the first through fifth aspects, selecting the new IP interface to associate with the UDP socket includes selecting, as the new IP interface, an unmetered IP interface included among the multiple available IP interfaces with a link rate estimate that satisfies a threshold, based on the current IP interface having a link rate estimate that fails to satisfy the threshold. In a seventh aspect, alone or in combination with one or more of the first through sixth aspects, selecting the new IP interface to associate with the UDP socket includes selecting, as the new IP interface, a metered IP interface included among the multiple available IP interfaces with a link rate estimate that satisfies a threshold, based on the current IP interface having a link rate estimate that fails to satisfy the threshold, and further based on the multiple available IP interfaces not including an unmetered IP interface with a link rate estimate that satisfies the threshold.

In an eighth aspect, alone or in combination with one or more of the first through seventh aspects, selecting the new IP interface to associate with the UDP socket includes selecting, as the new IP interface, an unmetered IP interface included among the multiple available IP interfaces with a highest link rate estimate, based on the current IP interface having a link rate estimate that fails to satisfy a threshold, and further based on the multiple available IP interfaces not including a metered or unmetered IP interface with a link rate estimate that satisfies the threshold.

In a ninth aspect, alone or in combination with one or more of the first through eighth aspects, the multiple available IP interfaces include one or more of a WLAN interface, a cellular interface, an Ethernet interface, a wireless WPAN interface, or a tethered USB interface.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
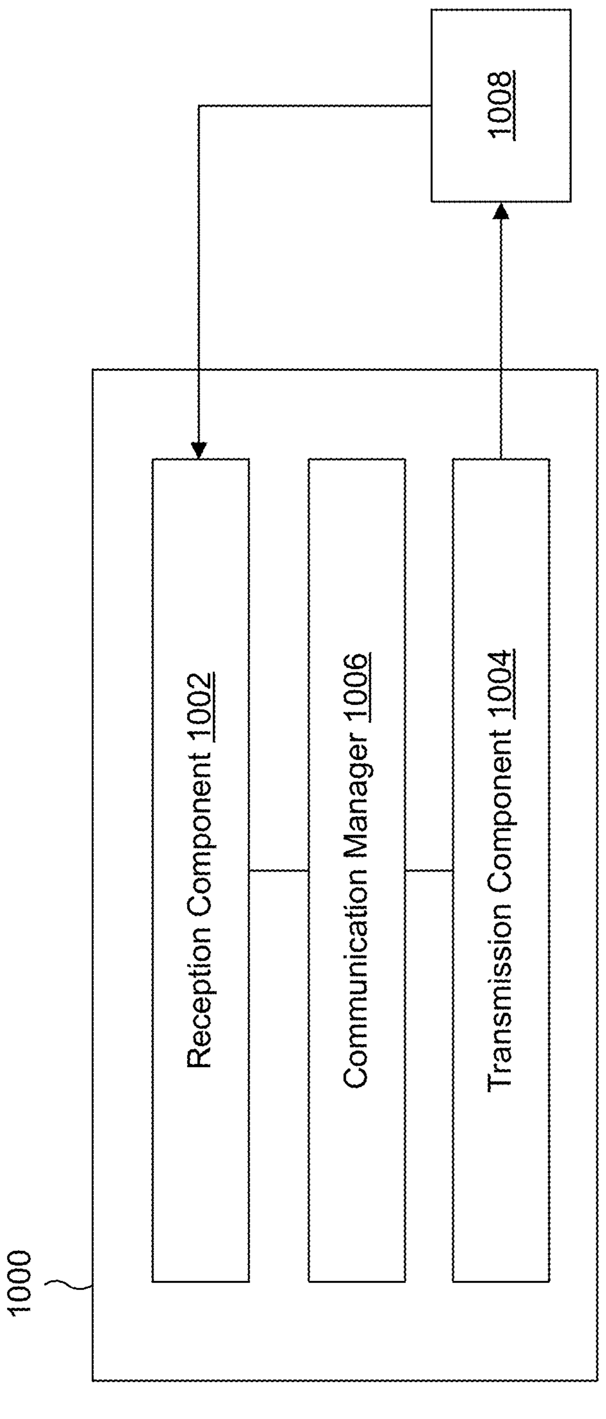
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 3-5 and/or FIGS. 7-8. Additionally, or alternatively, the apparatus 1000 may be configured to perform one or more processes described herein, such as process 600 of FIG. 6, process 900 of FIG. 9, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive a request to open, in parallel, multiple TCP socket connections associated with HTTP traffic. The communication manager 1006 may distribute the multiple TCP socket connections among multiple available IP interfaces, wherein distributing the multiple TCP socket connections includes selecting, from the multiple available IP interfaces, a respective IP interface to associate with each TCP socket connection. The communication manager 1006 may route the HTTP traffic associated with the multiple TCP socket connections over the multiple IP interfaces.

The communication manager 1006 may determine one or more of a link rate estimate or a number of active connections associated with each of the multiple available IP interfaces based on a time interval since a most recent update that satisfied a threshold.

The reception component 1002 may receive a request to open a UDP socket associated with QUIC traffic. The communication manager 1006 may select, from multiple available IP interfaces, a current IP interface that has a best QoS metric. The communication manager 1006 may route the QUIC traffic associated with the UDP socket over the current IP interface.

The communication manager 1006 may select, from the multiple available IP interfaces, a new IP interface to associate with the UDP socket based on the QoS metric associated with the current IP interface failing to satisfy a bandwidth requirement associated with the QUIC traffic.

The communication manager 1006 may route the QUIC traffic associated with the UDP socket over the new IP interface.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method, performed by a UE, for routing HTTP traffic, comprising: receiving a request to open, in parallel, multiple TCP socket connections associated with HTTP traffic; distributing the multiple TCP socket connections among multiple available IP interfaces, wherein distributing the multiple TCP socket connections includes selecting, from the multiple available IP interfaces, a respective IP interface to associate with each TCP socket connection; and routing the HTTP traffic associated with the multiple TCP socket connections over the multiple IP interfaces.

Aspect 2: The method of Aspect 1, wherein the respective IP interface to associate with each TCP socket connection is selected according to a link rate estimate or a number of active connections associated with each of the multiple available IP interfaces.

Aspect 3: The method of any of Aspects 1-2, further comprising: determining one or more of a link rate estimate or a number of active connections associated with each of the multiple available IP interfaces based on a time interval since a most recent update that satisfied a threshold.

Aspect 4: The method of any of Aspects 1-3, wherein the respective IP interface to associate with each TCP socket connection is selected according to a round robin scheduling algorithm.

Aspect 5: The method of any of Aspects 1-4, wherein the respective IP interface to associate with each TCP socket connection is selected from the multiple available IP interfaces based on the request originating from an application that is included in a whitelist.

Aspect 6: The method of any of Aspects 1-5, wherein selecting the IP interface to associate with a TCP socket connection, included among the multiple TCP socket connections, includes: selecting a default IP interface based on the default IP interface not having a current rate estimate.

Aspect 7: The method of any of Aspects 1-6, wherein selecting the IP interface to associate with a TCP socket connection, included among the multiple TCP socket connections, includes: selecting a default IP interface based on the default IP interface having a current rate estimate that satisfies a threshold.

Aspect 8: The method of any of Aspects 1-7, wherein selecting the IP interface to associate with a TCP socket connection, included among the multiple TCP socket connections, includes: selecting a default IP interface based on a secondary IP interface having a current rate estimate that fails to satisfy a threshold.

Aspect 9: The method of any of Aspects 1-8, wherein selecting the IP interface to associate with a TCP socket connection, included among the multiple TCP socket connections, includes: calculating, based on a secondary IP interface having a current rate estimate that satisfies a threshold, a number of TCP socket connections to be scheduled on the secondary IP interface using the current rate estimate; and selecting a default IP interface based on the number of TCP socket connections to be scheduled on the secondary IP interface not exceeding an active socket count associated with the secondary IP interface.

Aspect 10: The method of any of Aspects 1-9, wherein selecting the IP interface to associate with a TCP socket connection, included among the multiple TCP socket connections, includes: calculating, based on a secondary IP interface having a current rate estimate that satisfies a threshold, a number of TCP socket connections to be scheduled on the secondary IP interface using the current rate estimate; and selecting the secondary IP interface based on the number of TCP socket connections to be scheduled on the secondary IP interface exceeding an active socket count associated with the secondary IP interface.

Aspect 11: The method of any of Aspects 1-10, wherein selecting the IP interface to associate with a TCP socket connection, included among the multiple TCP socket connections, includes: calculating a number of TCP socket connections to be scheduled on a secondary IP interface based on the secondary IP interface lacking a current rate estimate; and selecting a default IP interface based on the number of TCP socket connections to be scheduled on the secondary IP interface not exceeding an active socket count associated with the secondary IP interface.

Aspect 12: The method of any of Aspects 1-11, wherein selecting the IP interface to associate with a TCP socket connection, included among the multiple TCP socket connections, includes: calculating a number of TCP socket connections to be scheduled on a secondary IP interface based on the secondary IP interface lacking a current rate estimate; determining that the number of TCP socket connections to be scheduled on the secondary IP interface exceeds an active socket count associated with the secondary IP interface; and selecting a default IP interface based on a time period, since a last selection of the secondary IP interface when the current rate estimate is unknown for the secondary IP interface, failing to satisfy a threshold.

Aspect 13: The method of any of Aspects 1-12, wherein selecting the IP interface to associate with a TCP socket connection, included among the multiple TCP socket connections, includes: calculating a number of TCP socket connections to be scheduled on a secondary IP interface based on a secondary IP interface lacking a current rate estimate; determining that the number of TCP socket connections to be scheduled on the secondary IP interface exceeds an active socket count associated with the secondary IP interface; and selecting the secondary IP interface based on a time period, since a last selection of the secondary IP interface when the current rate estimate is unknown for the secondary IP interface, satisfying a threshold.

Aspect 14: The method of any of Aspects 1-13, wherein the multiple available IP interfaces include one or more of a WLAN interface, a cellular interface, an Ethernet interface, a WPAN interface, or a tethered USB interface.

Aspect 15: A method, performed by a UE, for routing QUIC traffic, comprising: receiving a request to open a UDP socket associated with QUIC traffic; selecting, from multiple available IP interfaces, a current IP interface that has a best QOS metric; and routing the QUIC traffic associated with the UDP socket over the current IP interface.

Aspect 16: The method of Aspect 15, further comprising: selecting, from the multiple available IP interfaces, a new IP interface to associate with the UDP socket based on the QoS metric associated with the current IP interface failing to satisfy a bandwidth requirement associated with the QUIC traffic; and routing the QUIC traffic associated with the UDP socket over the new IP interface.

Aspect 17: The method of Aspect 16, wherein the new IP interface is selected based on expiration of a timer since a most recent switch of the IP interface associated with the UDP socket.

Aspect 18: The method of Aspect 16, wherein selecting the new IP interface to associate with the UDP socket includes: remaining on the current IP interface, such that the new IP interface is the current IP interface, based on the current IP interface being unmetered and having a link rate estimate that satisfies a threshold.

Aspect 19: The method of Aspect 16, wherein selecting the new IP interface to associate with the UDP socket includes: remaining on the current IP interface, such that the new IP interface is the current IP interface, based on the current IP interface being metered and having a link rate estimate that satisfies a threshold, and further based on the multiple available IP interfaces not including an unmetered IP interface with a link rate estimate that satisfies the threshold.

Aspect 20: The method of Aspect 16, wherein selecting the new IP interface to associate with the UDP socket includes: selecting, as the new IP interface, an unmetered IP interface included among the multiple available IP interfaces with a link rate estimate that satisfies a threshold, based on the current IP interface being metered and having a link rate estimate that satisfies the threshold.

Aspect 21: The method of Aspect 16, wherein selecting the new IP interface to associate with the UDP socket includes: selecting, as the new IP interface, an unmetered IP interface included among the multiple available IP interfaces with a link rate estimate that satisfies a threshold, based on the current IP interface having a link rate estimate that fails to satisfy the threshold.

Aspect 22: The method of Aspect 16, wherein selecting the new IP interface to associate with the UDP socket includes: selecting, as the new IP interface, a metered IP interface included among the multiple available IP interfaces with a link rate estimate that satisfies a threshold, based on the current IP interface having a link rate estimate that fails to satisfy the threshold, and further based on the multiple available IP interfaces not including an unmetered IP interface with a link rate estimate that satisfies the threshold.

Aspect 23: The method of Aspect 16, wherein selecting the new IP interface to associate with the UDP socket includes: selecting, as the new IP interface, an unmetered IP interface included among the multiple available IP interfaces with a highest link rate estimate, based on the current IP interface having a link rate estimate that fails to satisfy a threshold, and further based on the multiple available IP interfaces not including a metered or unmetered IP interface with a link rate estimate that satisfies the threshold.

Aspect 24: The method of any of Aspects 15-23, wherein the multiple available IP interfaces include one or more of a WLAN interface, a cellular interface, an Ethernet interface, a WPAN interface, or a tethered USB interface.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for routing QUIC (Quick UDP Internet Connections) traffic, comprising:

one or more memories; and one or more processors, coupled to the one or more memories, configured to:

receive a request to open a user datagram protocol (UDP) socket associated with QUIC traffic;

select, from multiple available internet protocol (IP) interfaces, a current IP interface that has a best quality of service (QOS) metric; and route the QUIC traffic associated with the UDP socket over the current IP interface.

2. The UE of claim 1, wherein the one or more processors are further configured to:

select, from the multiple available IP interfaces, a new IP interface to associate with the UDP socket based on the QoS metric associated with the current IP interface failing to satisfy a bandwidth requirement associated with the QUIC traffic; and route the QUIC traffic associated with the UDP socket over the new IP interface.

3. The UE of claim 2, wherein the new IP interface is selected based on expiration of a timer since a most recent switch of the IP interface associated with the UDP socket.

4. The UE of claim 2, wherein the one or more processors, to select the new IP interface to associate with the UDP socket, are configured to:

remain on the current IP interface, such that the new IP interface is the current IP interface, based on the current IP interface being unmetered and having a link rate estimate that satisfies a threshold.

5. The UE of claim 2, wherein the one or more processors, to select the new IP interface to associate with the UDP socket, are configured to:

remain on the current IP interface, such that the new IP interface is the current IP interface, based on the current IP interface being metered and having a link rate estimate that satisfies a threshold, and further based on the multiple available IP interfaces not including an unmetered IP interface with a link rate estimate that satisfies the threshold.

6. The UE of claim 2, wherein the one or more processors, to select the new IP interface to associate with the UDP socket, are configured to:

select, as the new IP interface, an unmetered IP interface included among the multiple available IP interfaces with a link rate estimate that satisfies a threshold, based on the current IP interface being metered and having a link rate estimate that satisfies the threshold.

7. The UE of claim 2, wherein the one or more processors, to select the new IP interface to associate with the UDP socket, are configured to:

select, as the new IP interface, an unmetered IP interface included among the multiple available IP interfaces with a link rate estimate that satisfies a threshold, based on the current IP interface having a link rate estimate that fails to satisfy the threshold.

8. The UE of claim 2, wherein the one or more processors, to select the new IP interface to associate with the UDP socket, are configured to:

select, as the new IP interface, a metered IP interface included among the multiple available IP interfaces with a link rate estimate that satisfies a threshold, based on the current IP interface having a link rate estimate that fails to satisfy the threshold, and further based on the multiple available IP interfaces not including an unmetered IP interface with a link rate estimate that satisfies the threshold.

9. The UE of claim 2, wherein the one or more processors, to select the new IP interface to associate with the UDP socket, are configured to:

select, as the new IP interface, an unmetered IP interface included among the multiple available IP interfaces with a highest link rate estimate, based on the current IP interface having a link rate estimate that fails to satisfy a threshold, and further based on the multiple available IP interfaces not including a metered or unmetered IP interface with a link rate estimate that satisfies the threshold.

10. A method, performed by a user equipment (UE), for routing QUIC (Quick UDP Internet Connections) traffic, comprising:

receiving a request to open a user datagram protocol (UDP) socket associated with QUIC traffic;

selecting, from multiple available internet protocol (IP) interfaces, a current IP interface that has a best quality of service (QOS) metric; and routing the QUIC traffic associated with the UDP socket over the current IP interface.

11. The method of claim 10, further comprising:

selecting, from the multiple available IP interfaces, a new IP interface to associate with the UDP socket based on the QoS metric associated with the current IP interface failing to satisfy a bandwidth requirement associated with the QUIC traffic; and routing the QUIC traffic associated with the UDP socket over the new IP interface.

12. A user equipment (UE) for routing hypertext transfer protocol (HTTP) traffic, comprising:

one or more memories; and one or more processors, coupled to the one or more memories, configured to:

receive a request to open, in parallel, multiple transmission control protocol (TCP) socket connections associated with HTTP traffic;

distribute the multiple TCP socket connections among multiple available internet protocol (IP) interfaces, wherein distributing the multiple TCP socket connections includes selecting, from the multiple available IP interfaces, a respective IP interface to associate with each TCP socket connection; and route the HTTP traffic associated with the multiple TCP socket connections over the multiple IP interfaces.

13. The UE of claim 12, wherein the respective IP interface to associate with each TCP socket connection is selected according to a round robin scheduling algorithm or according to a link rate estimate or a number of active connections associated with each of the multiple available IP interfaces.

14. The UE of claim 12, wherein the respective IP interface to associate with each TCP socket connection is selected from the multiple available IP interfaces based on the request originating from an application that is included in a whitelist.

15. The UE of claim 12, wherein the one or more processors, to select the IP interface to associate with a TCP socket connection, included among the multiple TCP socket connections, are configured to:

select a default IP interface based on the default IP interface not having a current rate estimate, based on the default IP interface having a current rate estimate that satisfies a threshold, or based on a secondary IP interface having a current rate estimate that fails to satisfy a threshold.

16. The UE of claim 12, wherein the one or more processors, to select the IP interface to associate with a TCP socket connection, included among the multiple TCP socket connections, are configured to:

calculate, based on a secondary IP interface having a current rate estimate that satisfies a threshold, a number of TCP socket connections to be scheduled on the secondary IP interface using the current rate estimate; and select a default IP interface based on the number of TCP socket connections to be scheduled on the secondary IP interface not exceeding an active socket count associated with the secondary IP interface.

17. The UE of claim 12, wherein the one or more processors, to select the IP interface to associate with a TCP socket connection, included among the multiple TCP socket connections, are configured to:

calculate, based on a secondary IP interface having a current rate estimate that satisfies a threshold, a number of TCP socket connections to be scheduled on the secondary IP interface using the current rate estimate; and select the secondary IP interface based on the number of TCP socket connections to be scheduled on the secondary IP interface exceeding an active socket count associated with the secondary IP interface.

18. The UE of claim 12, wherein the one or more processors, to select the IP interface to associate with a TCP socket connection, included among the multiple TCP socket connections, are configured to:

calculate a number of TCP socket connections to be scheduled on a secondary IP interface based on the secondary IP interface lacking a current rate estimate; and select a default IP interface based on the number of TCP socket connections to be scheduled on the secondary IP interface not exceeding an active socket count associated with the secondary IP interface.

19. The UE of claim 12, wherein the one or more processors, to select the IP interface to associate with a TCP socket connection, included among the multiple TCP socket connections, are configured to:

calculate a number of TCP socket connections to be scheduled on a secondary IP interface based on the secondary IP interface lacking a current rate estimate;

determine that the number of TCP socket connections to be scheduled on the secondary IP interface exceeds an active socket count associated with the secondary IP interface; and select a default IP interface based on a time period, since a last selection of the secondary IP interface when the current rate estimate is unknown for the secondary IP interface, failing to satisfy a threshold.

20. The UE of claim 12, wherein the one or more processors, to select the IP interface to associate with a TCP socket connection, included among the multiple TCP socket connections, are configured to:

calculate a number of TCP socket connections to be scheduled on a secondary IP interface based on a secondary IP interface lacking a current rate estimate;

determine that the number of TCP socket connections to be scheduled on the secondary IP interface exceeds an active socket count associated with the secondary IP interface; and select the secondary IP interface based on a time period, since a last selection of the secondary IP interface when the current rate estimate is unknown for the secondary IP interface, satisfying a threshold.

* * * * *